United States Patent [19]
Matsui

[11] Patent Number: 6,028,539
[45] Date of Patent: Feb. 22, 2000

[54] BUFFER CONTROL METHOD, AND DECODING APPARATUS PERFORMING BUFFER CONTROL

[75] Inventor: Yoshinori Matsui, Katanoshi, Japan

[73] Assignee: Matsushita Electric Industrial Co., Ltd., Japan

[21] Appl. No.: 09/018,393

[22] Filed: Feb. 4, 1998

[30] Foreign Application Priority Data

Feb. 7, 1997 [JP] Japan ................................ 9-024915

[51] Int. Cl.⁷ ................................................. H03M 7/00
[52] U.S. Cl. .............................................. 341/55; 341/60
[58] Field of Search .................................. 341/55, 60, 67, 341/101, 50, 87, 106

[56] References Cited

U.S. PATENT DOCUMENTS

| | | | |
|---|---|---|---|
| 5,794,228 | 8/1998 | French | 341/50 |
| 5,913,229 | 6/1999 | Joo | 341/60 |

*Primary Examiner*—Brian Young
*Attorney, Agent, or Firm*—Pakhurst & Wendel, L.L.P.

[57] ABSTRACT

It is intended to provide a buffer control method which performs control by deciding if data should be held in buffer, thereby enabling to reuse the data stored in the buffer. This method has the following steps of: storing data in a buffer; receiving, as an input, expiration time information indicating a time to stop holding the data; comparing time clock information indicating a time clock of a decoding apparatus with the expiration time information; and controlling the holding of the data within the buffer according to the comparison.

18 Claims, 10 Drawing Sheets

BUFFER CONTROL METHOD, AND DECODING APPARATUS PERFORMING BUFFER CONTROL

FIELD OF THE INVENTION

The present invention relates to a decoding apparatus performing buffer control and a recording medium for a decoding program used for buffer control. More particularly, it relates to control of a buffer used for performing decoding processing to coded digital data.

BACKGROUND OF THE INVENTION

Technologies for digitization and compression of picture and audio data which are originally analog have made progress. The merits of using digitized data are as follows: various types of data including picture, audio, and text data can he treated uniformly; application of compression technology in recording or communicating data can utilize the capacity of storage unit and limited transmission bandwidth fully and effectively while keeping a quality of data to be recorded or transmitted; and high technologies for error correction and encryption can be used with ease.

For transmitting and receiving the digitized data and the compression-coded data, packetizing is generally performed. Packetizing means generating packets by splitting data into pieces of a given size and adding information to them, and transmitting and receiving data as packets can improve efficiency and precision of data communication. In packet switching in a computer network, for example, packets are transmitted separately and at different timings, through the network to their destination where they are reassembled to original data. Therefore, to each packet, information indicating a destination, a transmission source, and an order is added to each packet.

In transmission of packetized digital data, for example, plural types of digital data including picture, audio, and text information are split into pieces, respectively, and the information for utilizing the digital data is added to each piece to packetize the data. Then, multiplexing processing is performed on the assumption that packets based on plural types of data constitute a stream, and resultant multiplexed data is transmitted.

As an international standard method for technologies of compression-coding digital data such as picture, audio, and text data, multiplexing plural pieces of compression-coded digital data, and transmitting the resultant data, Moving Picture Experts Group, Phase 2 (MPEG2) has become pervasive (for reference purpose, see ISO/IEC JTC1/SC29/WG11 N801,"ISO/IEC 13818 1 *International Standard: INFORMATION TECHNOLOGY-GENERIC CODING OF MOVING PICTURES AND ASSOCIATED AUDIO: SYSTEMS"*, 1994, November), and Moving Picture Exports Group, Phase. 4 (MPEG4) is being under study (for reference purpose, see ISO/IEC JTC1/SC29/WG11 N1483, *"Systems Working Draft Version 2.0"*, 1996, November). MPEG4 has a feature that digital data including picture, audio, and text data are treated, and in each case, specific components are treated as objects; for example, the objects included in a picture are used as objects. FIG. 8 is a conceptual diagram for explaining object processing. Hereinafter a description is given of the object processing with reference to FIG. 8.

Digital picture data obtained by digitizing a picture is identical to a sequence of still picture data, and one piece of the picture data corresponding to one screen (frame) is called a frame picture. As shown in FIG. 8, it can be thought that one frame picture S801 is composed of three objects: a background S802, a water plant S803, and a fish S804. In the object processing for moving picture, the processing efficiency is improved generally by treating specific objects included in a moving picture (the water plant and the fish in this case) and the other objects (a background in this case) separately.

In MPEG4, each object data is compression-coded and multiplexed with time information that consists of a time clock reference and presentation time information of each object data, and the resultant multiplexed data is transmitted or recorded. Time information is used for appropriate decoding of the multiplexed data transmitted or recorded to obtain pictures.

FIG. 9 is a block diagram illustrating the construction of a prior art decoding apparatus whose processing object is such multiplexed data. As shown in the figure, the prior art decoding apparatus comprises a demultiplexing means 901, a decoding buffer 902, an object decoding means 903, a composition buffer 904, a compositing means 905, a composited data buffer 906, a presenting means 907, and a time clock generating means 908.

The demultiplexing means 901 receives multiplexed data which is a processing object for the decoding apparatus, as an input, and demultiplexes the same to generate a predetermined number of pieces of coded object data, time clock reference information, and presentation time information of object data. In this case, three pieces of object data are used.

The decoding buffer 902 temporarily stores the coded object data which are processing objects of decoding processing. The decoding buffer 902 comprises first to third decoding buffers 902*a* to 902*c* used for temporarily storing the first to third coded object data. The object decoding means 903 performs decoding processing to the coded object data temporarily stored in the decoding buffer to generate decoded object data. The object decoding means 903 comprises first to third object decoding means 903*a* to 903*c* used for processing the first to third object data. The composition buffer 904 temporarily stores the decoded object data which is a processing object of composition processing, and comprises first to third composition buffers 904*a* to 904*c* employed for temporary storage of the first to third decoded object data.

The compositing means 905 composites pieces of decoded object data to generate composited object data. The composited data buffer 906 temporarily stores composited object data which is an object to be presented. The presenting means 907 presents composited object data based on presentation time information of object and a time clock which will be described later. The time clock generating means 908 generates a time clock used for decoding processing, based on the time clock reference information which has been multiplexed with the coded data to be transmitted.

Hereinafter a description is given of the operation for processing multiplexed data in the prior art decoding apparatus which is thus constructed.

First of all, multiplexed data S951 which is a processing object for the decoding apparatus is input to the demultiplexing means 901. The demultiplexing means 901 demultiplexes the multiplexed data S951 to generate first to third coded object data S952, S953, and S954, time clock reference information S955, and presentation time information of object data S956. Then, the demultiplexing means 901 outputs the first to third coded object data S952 to S954 to the first to third decoding buffers 902*a* to 902*c*, the time clock reference information S955 to the time clock generating means 908, and the presentation time information S956 to the presenting means 907, respectively. The first to third decoding buffers 902a to 902c store the first to third input coded object data S952 to S954 until the first to third object decoding means 903a to 903c fetch them, respectively.

The first to third object decoding means 903a to 903c fetch the coded object data S952 to S954 from the first to third decoding buffers 902a to 902c, respectively, and perform decoding processing to generate the first to third decoded object data S957 to S959, outputting the same to the first to third composition buffers 904a to 904c, respectively. The first to third composition buffers 904a to 904c store the first to third decoded object data S957 to S959 until the compositing means 905 fetches the same.

The compositing means 905 fetches the first to third decoded object data S957 to S959 from the first to third composition buffer 904a to 904c, respectively, and performs composition processing to generate composited object data S960, outputting it to the composited data buffer 906. The composited data buffer 906 stores the input composited object data S960 until the presenting means 907 fetches the same.

On the other hand, the time clock generating means 908, which has a function of generating clock signals, generates time clock information S961 based on time clock reference information S955 using the generated clock signals, and outputs it to the presenting means 907. The time clock information S961 is the time information used for the processing in the decoding apparatus. The presenting means 907 compares the input time clock information S961 with the presentation time information S956. When it is judged that the time clock information S961 conforms to the presentation time information S956, this presenting means fetches the composited object data S960 stored in the composited data buffer 906 to present it.

As described above, in the prior art picture decoding apparatus, use of decoding buffer, composition buffer, and composited data buffer enables to perform demultiplexing of multiplexed data, decoding processing, composition processing, and presentation simultaneously while receiving multiplexed data. As these buffers, employed are relatively high-speed storage media such as semiconductor memories. Because the buffers' capacity is finite, in the prior art decoding apparatus, the following controls are performed to he respective buffers included therein.

In the decoding buffer 902a, when object data "Data 1" is stored, a storage area of the decoding buffer (storage medium) where "Data 1" is stored is protected from writing. Therefore, "Data 2", which is the data input following "Data 1", is stored in any storage area of the decoding buffer 902a other than the area where "Data 1" is stored. Consequently, "Data 1" is held in the decoding buffer 902a until the decoding processing at the subsequent stage is performed, protected from being overwritten by the subsequent data to be stored. Then, when "Data 1" is subjected to processing by the object decoding means, the protection over the storage area of the decoding buffer 902a where "Data 1" is stored is canceled. This means that it is possible to overwrite the subsequent data, "Data N", in the area where "Data 1" is stored.

Also in the buffers other than the decoding buffer 902a, the same buffer control is performed. In each buffer, when the data stored therein is subjected to the processing at the subsequent stage, namely, composition processing for the composition buffer and presentation for the composited data buffer, overwriting can be performed in the storage area which the data has occupied.

As described above, in the prior art decoding apparatus, by means of buffers which are storage media of finite capacities, multiplexed data is demultiplexed to obtain coded object data and time information, and the coded object data is decoded, composited, and presented correctly according to time information.

In the prior art decoding apparatus, the abovedescribed control over data storage is performed in each of the decoding buffer 902, the composition buffer 904, and the composited data buffer 906, and input data is held until a processing is performed at a subsequent stage, but the data stored in each buffer cannot be treated as a processing object of the same processing two times.

FIG. 10 is a diagram for explaining a possibility of reusing object data in the decoding apparatus. As shown in the figure, frame pictures S1001 to S1004 are picture data ordered in a time series, and in the decoding apparatus, they are presented in this order. In the case of treating a fish included in each frame picture as specific object data, the object data of the fish included in the frame picture S1001 is identical to that included in the frame picture S1003, and reuse of the data is possible as long as the data is held. The reuse of data can reduce consumed capacity of recording media and occupancy of transmission paths, as well as amount of coded object data.

Further, in games treating moving pictures, when performing coding and decoding processing to object data object is presented repeatedly and periodically, which means that reuse of the data is highly effective. Furthermore, in such games, continued presentation of object and deletion of object are determined depending on events which occur corresponding to user's operation, and thus a control is desired which permits reuse of data when continuing the presentation is determined.

Thus, in the buffer control of the prior art decoding apparatus, holding data after the processing at subsequent stage is not considered. Further, although it is unreal to hold the whole data stored in buffers of finite capacities, it is not possible to judge which object should be reused as well as to specify a storage period, which prevents improvement of processing efficiency and effective utilization of device resource by reuse of data stored in the buffer.

SUMMARY OF THE INVENTION

An object of the present invention is to provide a buffer control method that enables data reuse by determining if the data temporarily stored in a buffer used for decoding processing to multiplexed data should be held and holding the data which might be reused, thereby realizing improved processing efficiency and effective utilization of device resource.

Another object of the present invention is to provide a decoding apparatus performing a buffer control that enables data reuse by determining if the data temporarily stored in a buffer used for decoding processing to multiplexed data should be held and holding the data which might be reused, thereby realizing improved processing efficiency and effective utilization of device resource Still another object of the present invention is to provide a recording medium used for recording a decoding program executed in computer system to perform a buffer control that can realize data reuse by determining if the data temporarily stored in a buffer used for decoding processing to multiplexed data should be held and holding the data which might be reused, thereby realizing improved processing efficiency and effective utilization of device resource.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, provided is a buffer control method which controls a buffer used for decoding processing when coded digital data is input, and this control method comprises: an input step where the input digital data is stored in a decoding buffer; a decoding step where decoding processing is performed to the digital data stored in the decoding buffer using an operating buffer for decoding to generate decoded digital data, and the decoded digital data is stored in a composition buffer; a time clock generating step where time clock reference information used for obtaining a time clock for decoding processing is input, and time clock information indicating the time clock is generated based on the time clock reference information; a presentation step where presentation time specifying information that specifies a time at which specific digital data should be presented is input, and the specific digital data is presented using the time clock information and the presentation time specifying information; and a buffer managing step where a previously set deletion condition that determines deletion of specific digital data is input, and control is performed such that the specific digital data shall not be held in a buffer when the deletion condition is satisfied. Therefore, corresponding to a set deletion condition, control is performed over holding specific digital data in a buffer and canceling the holding.

According to a second aspect of the present invention, in the presentation step of the buffer control method of the first aspect, the decoded digital data stored in the composition buffer is presented.

According to a third aspect of the present invention, in the buffer control method of the first aspect, the input coded digital data comprises first to N-th digital data, and this control method includes: the input step where the first to N-th digital data input are stored in first to N-th decoding buffers, respectively; the decoding step where decoding processing is performed to the first to N-th digital data stored in the first to N-th decoding buffers, using first to N-th operating buffers for decoding, to generate first to N-th decoded digital data and storing the data to first to N-th composition buffers, a compositing step of compositing the first to N-th decoded digital data stored in the first to N-th composition buffers to generate composited digital data and storing the composited data in a composited data buffer; and the presentation step where the composited digital data stored in the composited data buffer is presented.

According to a fourth aspect of the present invention, in the buffer managing step of the buffer control method of the first aspect, holding of digital data in the decoding buffer is controlled based on the deletion condition. Therefore, in the decoding buffer, coded digital data is held.

According to a fifth aspect of the present invention, in the buffer managing step of the buffer control method of the first aspect, holding of digital data in the operating buffer for decoding is controlled based on the deletion condition. Therefore, in the operating buffer for decoding, the data at a stage of the decoding process is held.

According to a sixth aspect of the present invention, in the buffer managing step of the buffer control method of the first aspect, holding of decoded digital data in the composition buffer is controlled based on the deletion condition. Therefore, in the composition buffer, the data subjected to decoding processing is held.

According to a seventh aspect of the present invention, in the buffer managing step of the buffer control method of the third aspect, holding of composited digital data in the composited data buffer is controlled based on the deletion condition. Therefore, in the composited data buffer, the composited data comprising plural pieces of decoded digital data is held.

According to an eighth aspect of the present invention, in the buffer managing step of the buffer control method of the first aspect, expiration time information indicating a specific time is used as the deletion condition. Therefore, digital data is held in a buffer until a time indicated by expiration time information is reached.

According to a ninth aspect of the present invention, in the buffer managing step of the buffer control method of the eighth aspect, the expiration time information is obtained based on a deletion command which requests to delete digital data and time information regarding the deletion command. Therefore, digital data is held in a buffer until a time indicated by expiration time information is reached.

According to a tenth aspect of the present invention, in the buffer managing step of the buffer control method of the first aspect, presentation time specifying information that specifies a time at which specific digital data should be presented is used as the deletion condition. Therefore, digital data is held in a buffer until a time indicated by presentation time specifying information is reached.

According to an eleventh aspect of the present invention, in the buffer managing step of the buffer control method of the tenth aspect, among plural pieces of presentation time specifying information for the specific digital data, the information whose value is maximum is used as the deletion condition. Therefore, digital data is held until a time indicated by one of plural pieces of presentation time specifying information that has a maximum value.

According to a twelfth aspect of the present invention, in the buffer managing step of the buffer control method of the first aspect, a deletion event condition as the information that indicates a specific one of events occurring in the decoding apparatus is used as the deletion condition, and control is performed based on the deletion event condition and event information that indicates an event occurring in the decoding apparatus. Therefore, digital data is held in a buffer until specific event occurs in the decoding apparatus.

According to a thirteenth aspect of the present invention, provided is a decoding apparatus that receives coded digital data as an input and performs decoding processing while controlling a buffer used for data processing. The decoding apparatus comprises; a decoding buffer for storing the input digital data; an object decoding means for performing decoding processing to the digital data stored in the decoding buffer to generate decoded digital data; an operating buffer for decoding used for the operation for decoding process in the object decoding means; a composition buffer for storing the decoded digital data generated by the object decoding means; a time clock generating means for receiving time clock reference information used for obtaining a time clock for decoding, as an input, and generating time clock information indicating the time clock based on the time clock reference information; a presenting means for receiving presentation time specifying information that indicates a time at which specific digital data should be presented, as an input, and presenting the specific digital data based on the time clock information and the presentation time specifying information; and a buffer managing means for receiving a previously set deletion condition that determines deletion of specific digital data, as an input, and controlling such that the specific digital data shall not be held in a buffer when the deletion condition is satisfied. Therefore, corresponding to a set deletion condition, control is performed over holding specific digital data and canceling the holding.

According to a fourteenth aspect of the present invention, in the decoding apparatus of the thirteenth aspect, the presenting means presents the decoded digital data stored in the composition buffer.

According to a fifteenth aspect of the present invention, in the decoding apparatus of the thirteenth aspect, with the input coded digital data input comprising first to N-th digital data, the decoding buffer comprises first to N-th decoding buffers for storing the first to N-th digital data, respectively; the object decoding means comprises first to N-th object decoding means for performing decoding processing to the first to N-th digital data stored in the first to N-th decoding butters to generate first to N-th decoded digital data; the operating buffer for decoding comprises first to N-th operating buffers for decoding that are used by the first to N-th object decoding means, respectively; and the composition buffer comprises first to N-th composition buffers for storing the first to N-th decoded digital data. The decoding apparatus further includes a compositing means for compositing the first to N-th decoded digital data stored in the first to N-th composition buffers and a composited data buffer for storing the composited digital data, and the composited digital data stored in the composited data buffer is presented by the presenting means.

According to a sixteenth aspect of the present invention, a decoding program recording medium is used for recording a decoding program which performs decoding processing with control over a buffer used for data processing The decoding program comprises: an input step where input digital data is stored in a decoding buffer; a decoding step where decoding processing is performed to the digital data stored in the decoding buffer to generate decoded digital data, and the decoded digital data is stored in a composition buffer; a time clock generating means where time clock reference information used for obtaining a time clock for decoding processing is input, and time clock information indicating the time clock is generated based on the time clock reference information; a presentation step where presentation time specifying information that indicates a time at which specific digital data should be presented is input, and the specific digital data is presented using the time clock information and the presentation time specifying information; and a buffer managing step where a previously set deletion condition which determines deletion of specific digital data is input, and control is performed such that the specific digital data shall not be held when the deletion condition is satisfied. Therefore, corresponding to a set deletion condition, control is performed over holding specific digital data in a buffer and canceling the holding.

According to a seventeenth aspect of the present invention, the decoding program recording medium of the sixteenth aspect is used for recording the decoding program wherein, in the presentation step, the decoded digital data stored in the composition buffer is presented.

According to an eighteenth aspect of the present invention, the decoding program recording medium of the sixteenth aspect is used for recording the decoding program in which the input coded digital data comprises first to N-th digital data. The decoding program includes: the input step where the first to N-th input digital data are stored in first to N-th decoding buffers; the decoding step where decoding processing is performed to the first to N-th digital data stored in the first to N-th decoding buffers, using first to N-th operating buffers for decoding, to generate first to N-th decoded digital data and storing the decoded digital data in first to N-th composition buffers, and a composition step of compositing the first to N-th decoded digital data stored in the first to N-th composition buffers to generate composited digital data and storing the composited digital data in a composited data buffer; and the presentation step where the composited digital data stored in the composited data buffer is presented.

DETAILED DESCRIPTION OF THE PREFERRED EMBODIMENTS

Embodiment 1

In a buffer control method according to a first embodiment of the present invention, judgement is made based on a deletion condition which permits deletion of the data stored in a buffer, and the data is held in the buffer if the condition is not satisfied.

Figure 1:
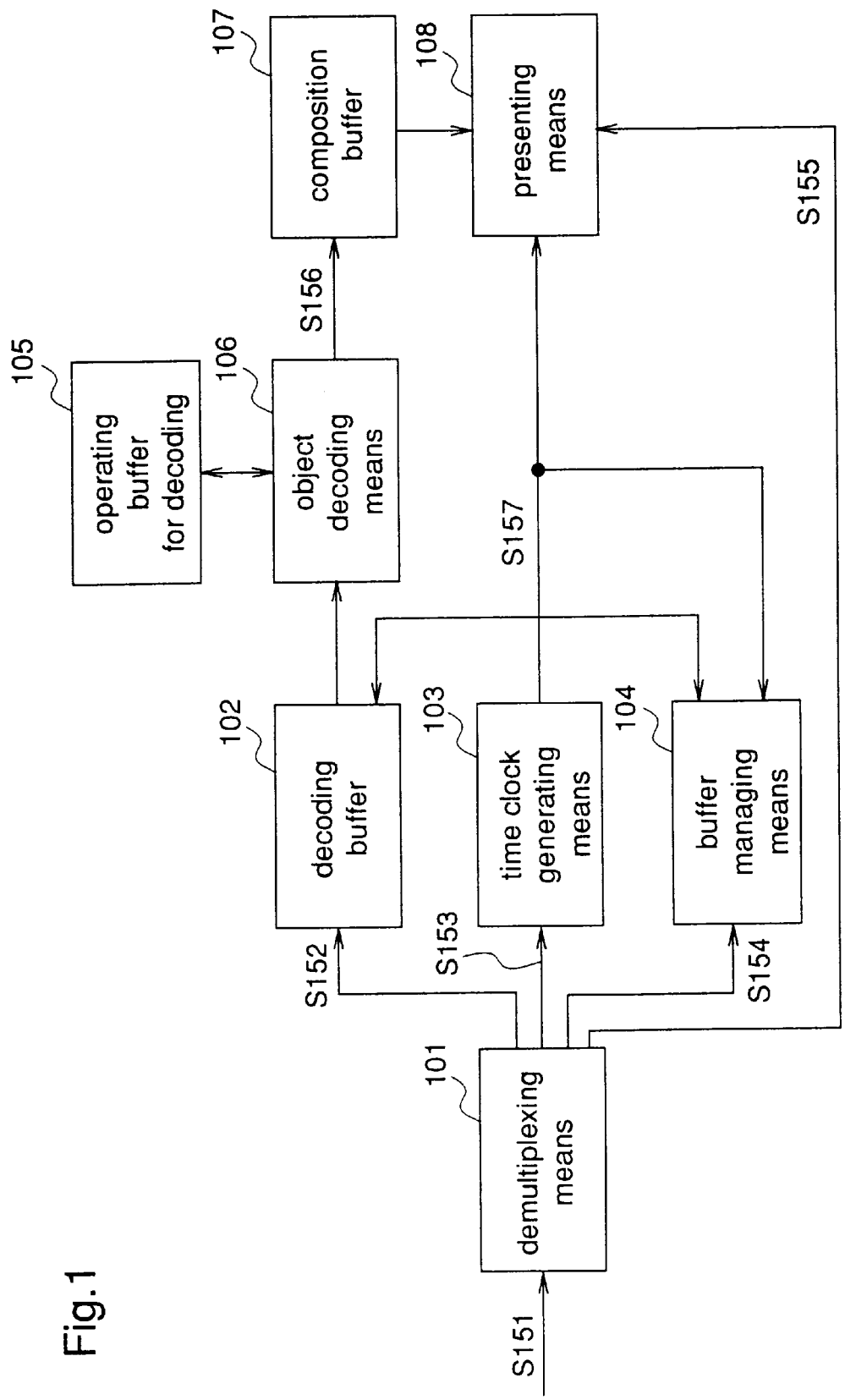
FIG. 1 is a block diagram illustrating the construction of a decoding apparatus performing buffer control according to a first embodiment of the present invention.
Figure 2:
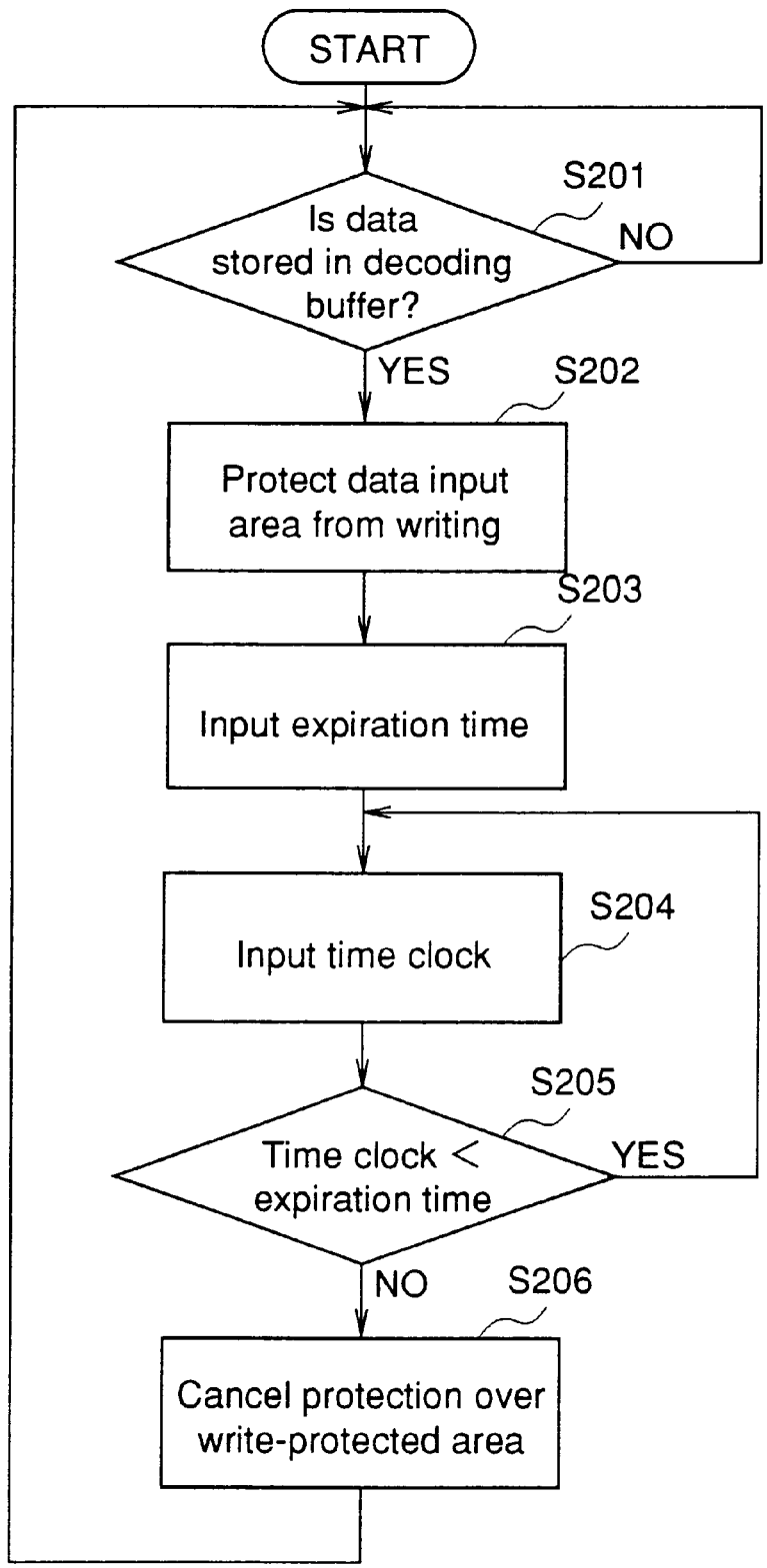
FIG. 2 is a flowchart illustrating the process steps of a buffer control performed by a buffer managing means according to the first embodiment.

FIG. 1 is a block diagram illustrating the construction of a decoding apparatus performing buffer control according to a first embodiment of the present invention, and FIG. 2 is a flowchart showing the process steps of a buffer control according to the first embodiment. As shown in FIG. 1, the decoding apparatus of the first embodiment comprises: a demultiplexing means 101, a decoding buffer 102, a time clock generating means 103, a buffer managing means 104, an operating buffer for decoding 105, an object decoding means 106, a composition buffer 107, and a presenting means 108.

The demultiplexing means 101 receives multiplexed data which is a processing object for the decoding apparatus, as an input, and demultiplexes it to generate coded object data, time clock reference information, expiration time information, and presentation time information of subject data. The decoding buffer 102 temporarily stores coded object data which is a processing object of decoding processing.

The time clock generating means 103 generates time clock information used for decoding processing based on time clock reference information transmitted as part of multiplexed data. The buffer managing means 104 controls storage and holding of data in the decoding buffer 102 using a deletion condition which will be described later and a time clock as the condition for judgement.

The object decoding means 106 performs decoding processing to coded object data to generate decoded object data. The composition buffer 107 temporarily stores decoded object data which is an object to be presented. The presenting means 108 presents decoded object data based on a time clock which will be described later and a presentation time of the object.

Hereinafter a description is given of the operation for multiplexed data processing by the decoding apparatus of the first embodiment having the above-described construction, with reference to FIGS. 1 and 2.

Multiplexed data S151 as a processing object is input to the decoding apparatus of the first embodiment. The multiplexed data S151 comprises coded object data, time clock reference information, and presentation time information, like the device input of the prior art decoding apparatus, and further includes deletion condition information of coded object data as well. The deletion condition of object indicates a condition which reduces or removes a possibility of reusing the object, and when this condition is satisfied, the decoding apparatus of the first embodiment stops holding object data in the buffers. Here, used as the deletion condition information is expiration time information, i.e., a time at which object data is not necessary to be held.

In the decoding apparatus of the first embodiment, the multiplexed data S151 is input to the demultiplexing means 101 which demultiplexes the multiplexed data S151 to generate coded object data S152, time clock reference information S153, expiration time information of object S154, and presentation time information of object data S155. The demultiplexing means 101 outputs the coded object data S152 to the decoding buffer 102, the time clock reference information S153 to the time clock generating means 103, the expiration time information S154 to the buffer managing means 104, and the presentation time information S155 to the presenting means 108, respectively. The decoding buffer 102 holds the coded object data input S152 under the control from the buffer managing means 104.

The decoding means 106 fetches the coded object data from the decoding buffer 102 and performs decoding processing using the operating buffer for decoding 105 to generate decoded object data S156. The object decoding means 106 copies the coded object data S152 held in the decoding buffer 102 to the operating buffer for decoding 105 while performing decoding processing to the data held by the operating buffer for decoding 105. The object decoding means 106 outputs the decoded object data S156 generated to the composition buffer 107 which holds the decoded object data S156 until the presenting means 108 fetches the same.

On the other hand, the time clock generating means 108, which has a function of generating clock signals, generates time clock information S157 based on time clock reference information S153 using the generated clock signals, outputting the same to the presenting means 108. The time clock information S157 is the time information used for the processing in the decoding apparatus. The presenting means 108 compares the input time clock information S157 with the presentation time information S155. Then, when the time clock information S157 conforms to the presentation time information S155, it fetches the decoded object data held in the composition buffer 107 and presents the same. Also in the decoding apparatus of the first embodiment, the time clock generating means 103 outputs the generated time clock information S157 to the buffer managing means 104 as well as the presenting means 108.

The buffer managing means 104 controls storage and holding of data in the decoding buffer 102 by the process steps shown in the flowchart of FIG. 2. First of all, in Step 201, it is judged whether coded object data is stored in the decoding buffer 102 or not. When the data is stored, Step 202 and other following steps are performed, and otherwise the decision is repeated in Step 201 until the data is input.

In Step 202, the buffer managing means 104 performs control so that the area of the decoding buffer 102 storing the coded object data S152 is protected from writing. Due to this, the coded object data S152 can be held in the decoding buffer 102 without being deleted or overwritten.

In Step 203, the buffer managing means 104 fetches the input expiration time information S153 from the demultiplexing means 101, setting it as a deletion condition. Next, in Step 204, the buffer managing means 104 fetches the time clock information S157 input from the time clock generating means 103, setting it as a condition for judgement.

In Step 205 which follows Step 204, the buffer managing means 104 makes a comparison between the time clock information S157 as a condition for judgement and the expiration time information S154 as a deletion condition. When the time clock information S157 does not reach the expiration time information S154, Step 204 is repeated where the condition for judgement is renewed by obtaining the time clock information S157 again, and then the judgement in Step 205 is performed.

A loop of Steps 204 and 205 is repeated, and when the time clock information S157 generated by the time clock generating means 103 conforms to or exceeds the expiration time information S154, Step 206 is performed. In Step 206, the buffer managing means 104 cancels the write protection over the area of the decoding buffer 102 which has been specified as a write protection area in Step 202. Therefore, in the following steps, coded object data which has been held due to the designation of write protection in Step 201 can be deleted by overwriting other data.

In the decoding apparatus according to the first embodiment, the coded object data is held in the decoding buffer 102 until a time indicated by expiration tine information is reached. Therefore, a setting can be performed such that if "repetition" is instructed to the object decoding means 106, for example, the coded object data held in the decoding buffer 102 is fetched to perform the decoding processing again, thereby realizing reuse of the coded object data in the decoding buffer 102.

As for the operating suffer for decoding 105 and the composition buffer 107, the same controls are performed as in the prior art decoding apparatus, such that the buffers do not hold the data once subjected to the processing at the subsequent stages.

Thus, the decoding apparatus performing buffer control according to the first embodiment comprises a buffer managing means 104, and this apparatus receives the multiplexed data including the information indicating a deletion condition, as an input, and controls storage and holding of coded object data in the decoding buffer 102 by making a comparison between the deletion condition information demultiplexed from the multiplexed data and the time information of the decoding apparatus Therefore, reuse of coded object data corresponding to a deletion condition is made possible, and the resultant reduction in an amount of coded data can realize effective utilization of storage and transmission media.

In the first embodiment, multiplexed data which includes expiration time information multiplexed with coded object data and others is input and then demultiplexed to be used, but an alternative is also applicable that expiration time information transmitted apart from the coded object data and the time clock reference information is utilized, and this can be applied easily by employing the construction in which the expiration time information transmitted alone can be input to the buffer managing means 104.

Generally, in satellite digital broadcasting, ground wave digital broadcasting, or Digital Versatile Disk (DVD), coded data multiplexed with time information and others is transmitted or recorded as multiplexed data; in Local Area Network (LAN) and the Internet, coded data and time information are not multiplexed together and transmitted separately. The buffer control according to the first embodiment, however, can be applied in either case.

In the first embodiment, expiration time of target object data is used as a condition, but in place of the expiration time, presentation time specifying information is also applicable which specifies a time at which specific digital data should be presented. Presentation time of object data or sum of this presentation time and a presentation duration may be applied as presentation time specifying information. In the case of performing such control, when plural presentation times are provided for one piece of object data, it is preferred to use the information having the maximum value so as to assure holding of the object data.

Further, in the first embodiment, the buffer managing means performs a control over holding of the object data within the decoding buffer, but the other buffer can be the target of the control. The reuse of stored data can be realized by controlling such that in the operating buffer for decoding, a specific data area, which is used for temporarily storing data during the decoding operation by the object decoding means to coded object data, is protected from writing, or in the composition buffer, an area for storing specific decoded object data is protected from writing.

In this case, when holding of data is performed in the decoding buffer as described in the first embodiment, the data held is the compression-coded one, and thus the storage of a storage medium required for holding is reduced. On the other hand, holding data in the operating buffer for decoding enables to omit a part of the decoding process for data reuse, and holding data in the composition buffer enables to present the data to be reused immediately, thereby improving process efficiency for data reuse although the storage of storage medium required for holding is increased because the data to be held is the decoded one.

Furthermore, there may be a case where limit is placed on a maximum amount of data stored in the decoding buffer, and thus overflow might be caused in the decoding buffer by inputting object data into the decoding buffer before the time clock of the decoding apparatus does not reach a expiration time of the object data, that is, when the previously stored object data is still held in the buffer. In this case, priorities are previously determined for each object data and the information indicating the priorities is assigned to each object data. The buffer managing means 104 then performs control such that that data of low-priority is deleted according to the priorities assigned to each object, thereby preventing overflow in the buffer. This control method is effective when the high-speed storage medium used as a buffer has a small capacity. This method may be used for control over the operating buffer for decoding and the composition buffer.

Embodiment 2

In a buffer control method according to a second embodiment of the present invention, control is performed with the same time information as in the first embodiment, using input data as multiplexed data including a command requesting to delete object data.

A decoding apparatus performing buffer control according to the second embodiment has the same construction as that in the first embodiment, and the description is given with reference to FIG. 1. In FIG. 1, the demultiplexing means 101 has a command extracting capability and extracts a command included in multiplexed data and time information regarding the command. The other components operate in the same way as in the first embodiment, and the description thereof is omitted.

Figure 3:
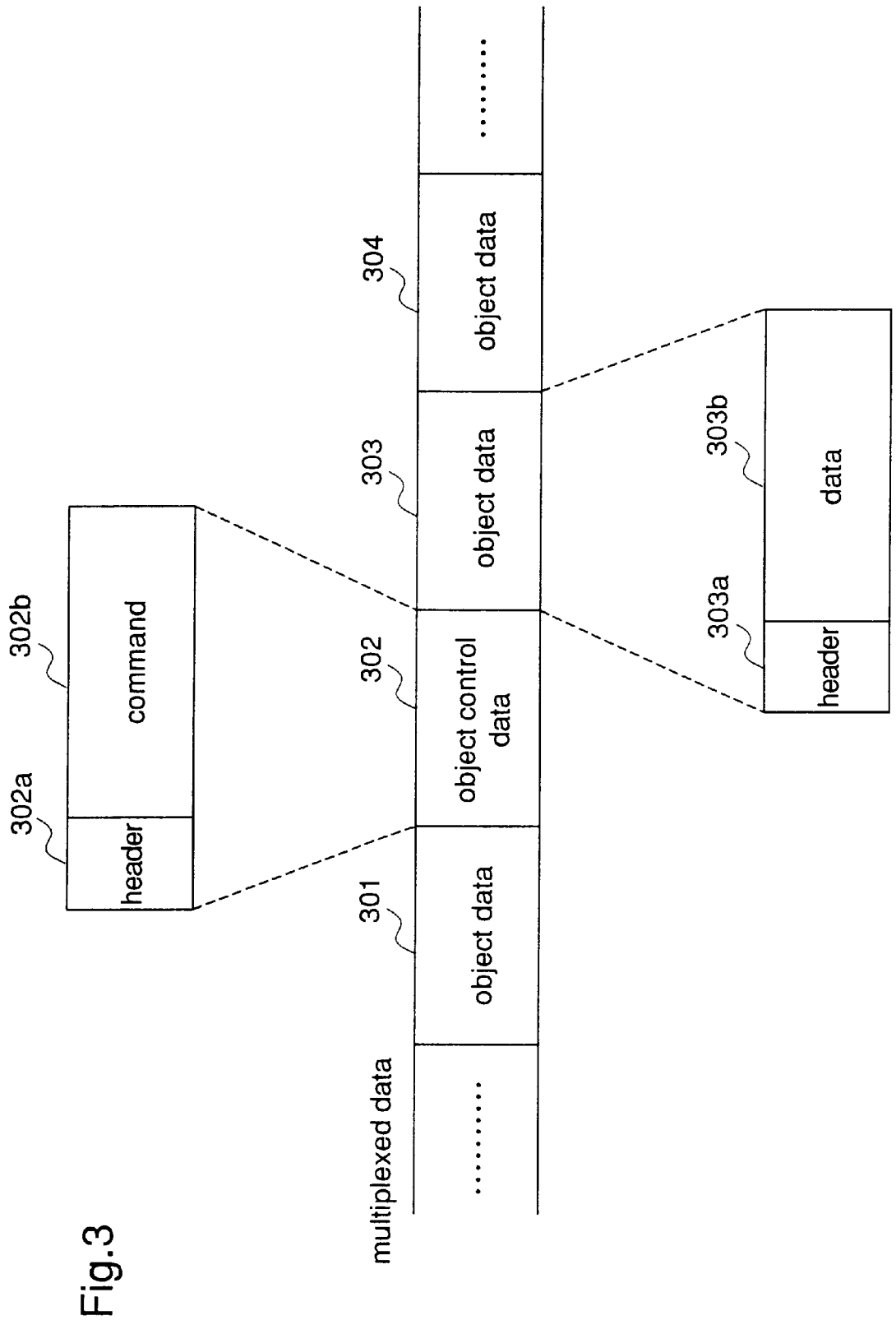
FIG. 3 is a diagram illustrating the structure of multiplexed data input in a second embodiment of the present invention.

FIG. 3 is a diagram illustrating the structure of multiplexed data input to the decoding apparatus according to the second embodiment. As described above, since different types of data such as picture, audio, and text data are treated in a same way as long as the data are digital, each type of data is treated as a packet of a prescribed size in transmission of digital data and thus multiplexed data is treated as a group of plural packets. In the figure, reference numerals 301 to 304 designate packets constituting multiplexed data numerals 301, 302, and 303 designate packets of object data, and numeral 302 designates a packet containing object control data (hereinafter referred to as command packet). As is understood from this figure, the command packet 302 consists of a header section 302a and a data section 302b containing a command as the main body, the header section 302a including time information regarding the command and the other information. The object data packet 303 has the same structure consisting of a header section 303a and a data section 303b including coded object data as the main body, the header section 303a including time information regarding the object data and the other information. In this case, the command packet 302 is a deletion command requesting to delete object, and the time information included in the header section 302a indicates a time at which the deletion command should be executed.

Hereinafter a description is given of the operation of the decoding apparatus according to the second embodiment when the multiplexed data illustrated in FIG. 3 is input.

Initially, the multiplexed data S151 shown in FIG. 3 is input to the decoding apparatus according to the second embodiment. The multiplexed data S151 is input to the demultiplexing means 101 where the data is demultiplexed into coded object data S152, time clock reference information S153, and presentation time information S155, as in the first embodiment, and output to the decoding buffer 102, the time clock generating means 103, and the presenting means 108, respectively. Then, since the demultiplexing means 101 included in the decoding apparatus of the second embodiment has a command extracting capability, when the command packet 302 shown in FIG. 3 is detected, this means obtains a command of deleting object and the information included in the header section 302a of the packet 302 which indicates a time at which the command should be executed. The demultiplexing means 101 outputs the time at which the deletion command should be executed to the buffer managing means 104 as expiration time information S154.

The decoding processing and presentation of object data, and the processing of the time information are performed in the same manner as in the first embodiment The control over the decoding buffer 102 is performed by the buffer managing means 104 using the expiration time information S154 in the same manner as in the first embodiment.

As described above, the decoding apparatus according to the second embodiment comprises a demultiplexing means 104 having a command extracting capability, and this apparatus receives the multiplexed data including a command requesting deletion and the information of a time at which the command should be executed, as an input, and controls storage and holding of coded object data in the decoding buffer 102 by making a comparison between the time information used as a deletion condition that is obtained from the above-described multiplexed data and the time information of the decoding apparatus, as in the first embodiment where the time information obtained from multiplexed data is used as it is, as a deletion condition. Therefore, the coded object data can be reused corresponding to a deletion condition, and the resultant reduction in an amount of coded data can realize effective utilization of storage and transmission media.

In the second embodiment, multiplexed data including a command multiplexed with coded object data and others is input, and then demultiplexed to be used. However, the command transmitted apart from the coded object data and the time clock reference information may be used.

Further in the second embodiment, the buffer managing means performs a control overholding of object data within the decoding buffer, but this control may be applied to the operating buffer for decoding or the composition buffer. The control over the decoding buffer can reduce storage of storage media consumed for holding as in the first embodiment, whereas the control over the operating buffer for decoding or the composition buffer can further improve processing efficiency for data reuse.

Furthermore, each buffer may be controlled without causing overflow in the buffer by performing control according to the priorities predetermined for each object.

Embodiment 3

In a buffer control method according to a third embodiment of the present invention, buffers used for data processing are controlled using a deletion condition when multiplexed data including plural pieces of object data is a processing object.

Figure 4:
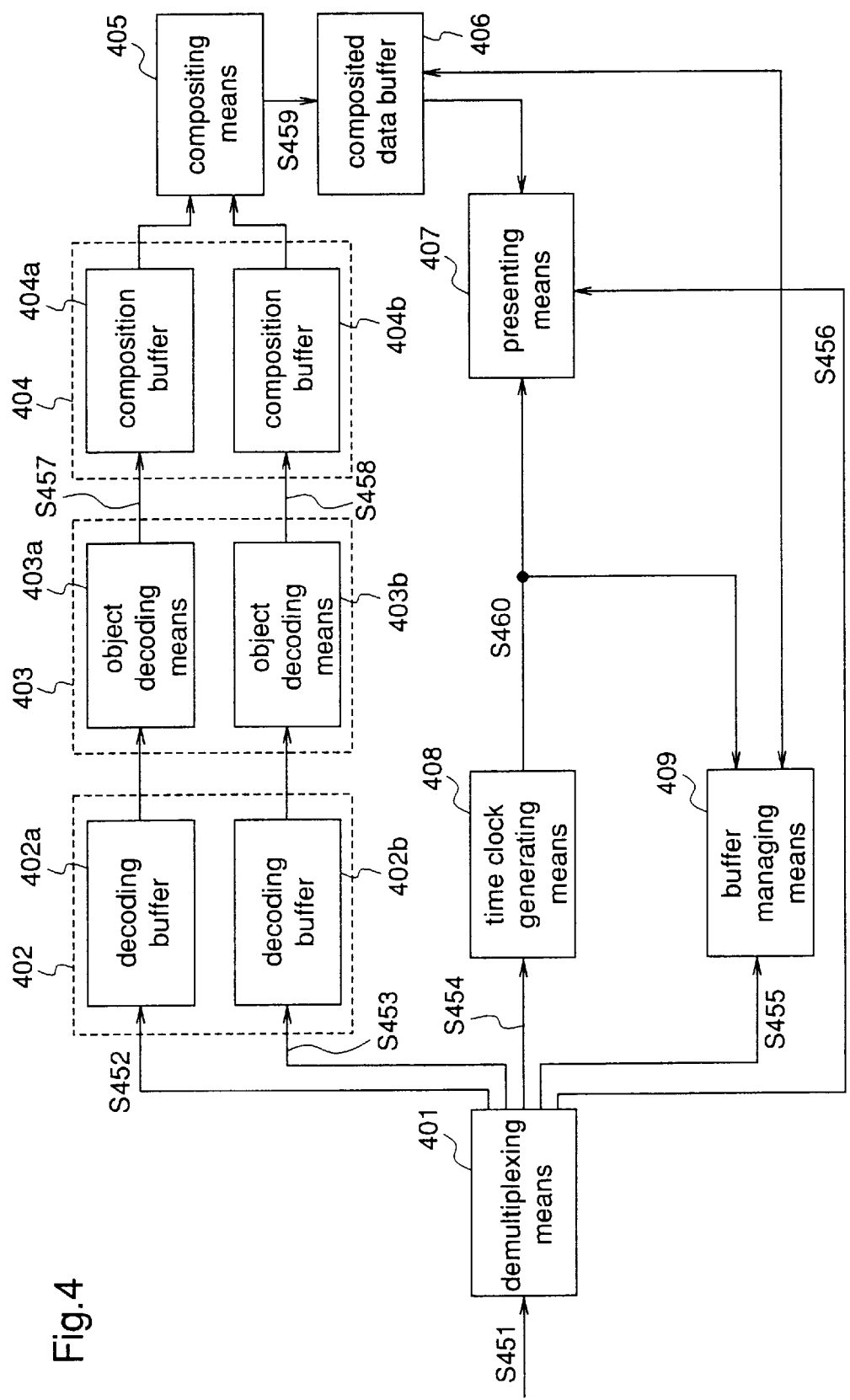
FIG. 4 is a block diagram illustrating the construction of a decoding apparatus performing buffer control according to a third embodiment of the present invention.

FIG. 4 is a block diagram illustrating the construction of a decoding apparatus performing buffer control according to the third embodiment of the present invention. As shown in FIG. 4, the decoding apparatus of the third embodiment comprises: a demultiplexing means 401, a decoding buffer 402, an object decoding means 403, a composition buffer 404, a compositing means 405, a composited data buffer 406, a presenting means 407, a time clock generating means 408, and a buffer managing means 409. Further, assume that the decoding apparatus of the third embodiment treats two pieces of object data.

The decoding buffer 402 temporally stores coded object data which is a processing object of decoding processing. The decoding buffer 402 comprises first and second decoding buffers 402a and 402b that are used for temporally storing first and second object data, respectively. The object decoding means 403 performs decoding processing to coded object data to generate decoded object data. The object decoding means 403 comprises first and second object decoding means 403a and 403b that are used for processing the first and second object data, respectively. Each of these decoding means includes an operating buffer for decoding and performs decoding processing using the operating buffer in the same manner as the object decoding means of the first embodiment. The composition buffer 404 temporally stores decoded object data which is a processing object of a composition processing at the subsequent stage. The composition buffer 404 comprises first and second composition buffers 404a and 404b that are used for temporally storing first and second decoded object data.

The compositing means 405 composites pieces of decoded object data to generate composited object data. The composited data buffer 406 temporally stores composited object data which is an object to be presented. The buffer managing means 409 controls storage and holding of data in the composited data buffer 406 using a deletion condition which will be described later and a time clock. The demultiplexing means 401 receives multiplexed data as an input, and demultiplexes it to generate coded object data, time clock reference information, deletion condition information, and presentation time information of object data, like the demultiplexing means 101 of the first embodiment. In the case now described, two pieces of the coded object data are generated. The presenting means 407 and the time clock generating means 408 operate in the same way as the presenting means 108 and the time clock generating means 103 of the first embodiment.

Hereinafter a description is given of the operation in the decoding process by the decoding apparatus of the third embodiment that is thus constructed.

First of all, multiplexed data S451 as a processing object for the decoding apparatus is input to the demultiplexing means 401 where the multiplexed data S451 is demultiplexed to generate first coded object data S452, second coded object data S453, time clock reference information S454, deletion condition information of composited object data S455, and presentation time information of object data S456. The deletion condition information is expiration time information, as in the first embodiment. The demultiplexing means 401 outputs the first coded object data S452 and the second coded object data S453 to the first and second decoding buffers 402a and 402b, the time clock reference information S454 to the time clock generating means 408, the expiration time information S455 to the buffer managing means 409, and the presentation time information S456 to the presenting means 407, respectively. The first and second decoding buffers 402a and 402b store the first coded object data S452 and the second coded object data S453 that are input, until the first and second object decoding means 403a and 403b fetch them, respectively.

The first and second object decoding means 403a and 403b fetch the coded object data S452 and S453 from the first and second decoding buffers 402a and 402b, respectively, and perform decoding processing using the included operating buffers for decoding to generate first decoded object data S457 and second decoded object data S458, outputting them to the first and second composition buffers 404a and 404b, respectively. The first and second composition buffers 404a and 404b store the first decoded object data S457 and the second decoded object data S458 which are input, until the compositing means 405 fetch them.

The compositing means 405 fetches the first decoded object data S457 and the second decoded object data S458 from the first and second composition buffers 404a and 404b, performs composition processing to generate composited object data S459, outputting the same to the composited data buffer 406. The composited data buffer 406 stores the input composited object data S459 until the presenting means 407 fetches it.

On the other hand, the time clock generating means 408, which has a capability of generating clock signals, generates time clock information S460 based on the time clock reference information S454, using the generated clock signal, and outputs the same to the presenting means 407. The time clock information S460 is the time information used for the processing in the decoding apparatus. The presenting means 407 compares the input time clock information S460 with the presentation time information S456. When it is judged that the time clock information S460 conforms to the presentation time information S456, the presenting means fetches the composited object data S459 stored in the composited data buffer 406 and presents the same. In the decoding apparatus of the third embodiment, the time clock generating means 408 outputs generated time clock information S460 to the buffer managing means 409 as well as the presenting means 407.

The buffer managing means 409 controls storage and holding of data in the composited data buffer 406 in the same process steps as ill the control of the first embodiment shown in the flowchart of FIG. 2. More specifically, when the composited object data is stored in the composited data buffer 406, the buffer managing means 409 protects the storage area from writing; the time clock generating means 408 compares the time clock information S460 with the input expiration time information S455, and when it judges that the time clock information S460 conforms to or exceeds the expiration time information S455, the buffer managing means 409 cancels the write protection in the composited data buffer 406.

In the decoding apparatus according to the third embodiment, the composited object data is held in the composited data butter 406 until a time indicated by expiration time information is reached. Therefore, a setting is performed such that, if "repetition" is instructed, the presenting means 407 fetches the composited object data held in the composited data buffer 406 to present it again, thereby implementing the reuse of the composited object data in the composited data buffer 406.

As for the decoding buffer 402, the operating buffers for decoding included in the object decoding means 403, and the composition buffer 404, the same controls as in the prior art decoding apparatus are performed, such that the buffers do not hold the data once subjected to the processing at the subsequent stages.

As described above, the decoding apparatus performing buffer control according to the third embodiment comprises a buffer managing means 409, and this apparatus receives multiplexed data including the information indicating a deletion condition, as an input, and controls storage and holding of composited object data within the composited data buffer 406 by comparing the information indicating a deletion condition with the time information of the decoding apparatus. Therefore, reuse of composited object data is made possible according to a deletion condition, and the resultant reduction in an amount of coded data can realize effective utilization of storage and transmission media.

Although in the third embodiment it is described that the multiplexed data including two pieces of object data, i.e., first object data and second object data, is used as an input, multiplexed data including first to N-th object data may be normally processed in the same manner by employing decoding buffer, object decoding means, and composition buffer, each N in number.

In the third embodiment, multiplexed data including expiration time information multiplexed with coded object data and others is input and later demultiplexed to be used, but the expiration time information transmitted apart from the time clock reference information and coded object data may be used.

Further, in place of the expiration time used in the third embodiment, presentation time of composited object data or a sum of the presentation time and the presentation duration may be used. In the case of performing the control, if plural presentation times are provided to one piece of coded object data, it is preferred to use the one having the maximum value so as to assure holding of coded object data, as in the first embodiment. Although in the third embodiment the buffer managing means performs control over holding of the object data within the composited data buffer, this control can be applied to the decoding buffers, the operating buffers for decoding included in the object decoding means, and the composition buffers. The control over the decoding buffers can reduce storage of storage media consumed for holding as in the first embodiment, and the control over the operating buffers for decoding, the composition buffers, or the composited data buffer can improve processing efficiency for data reuse.

In addition, each buffer can be controlled without overflow in the buffer if the control is performed according to the priorities predetermined for each object.

Embodiment 4

In a buffer control means according to a fourth embodiment of the present invention, control is performed based on the time information used in the third embodiment by using multiplexed data including a command requesting to delete object data as the input data.

The decoding apparatus performing buffer control according to the fourth embodiment has the same construction as that of the third embodiment, and thus the description is given with reference to FIG. 4. In FIG. 4, the demultiplexing means 401 comprises a command extracting capability, and extracts a command included in multiplexed data and time information regarding the command. The other components are identical to those in the third embodiment and the description on them will be omitted.

Figure 5:
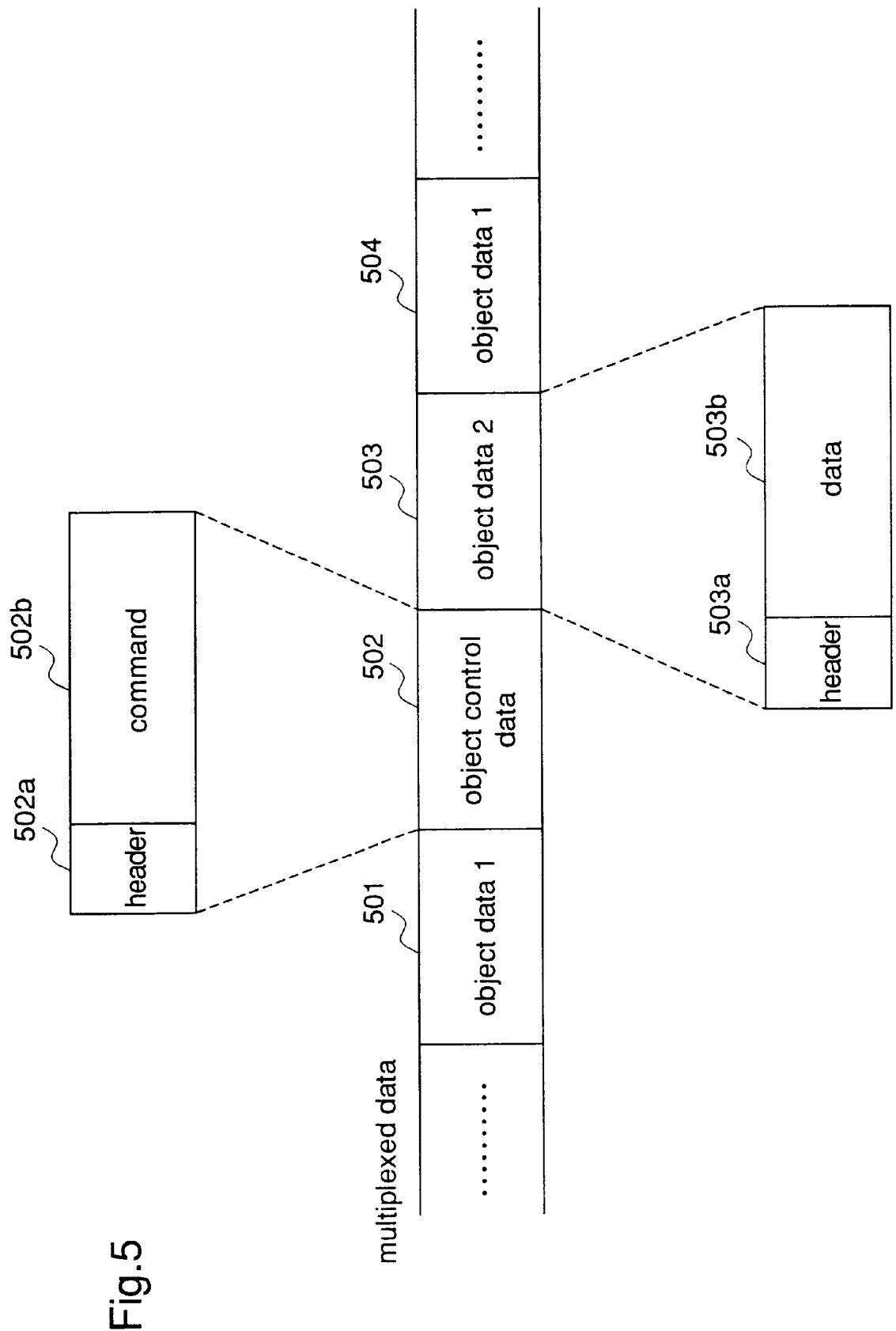
FIG. 5 is a diagram illustrating the structure of multiplexed data input in a fourth embodiment of the present invention.

FIG. 5 is a diagram illustrating the structure of multiplexed data which is input to the decoding apparatus of the fourth embodiment. The multiplexed data shown in FIG. 5 has the same structure as the multiplexed data input to the decoding apparatus of the second embodiment shown in FIG. 3, but this multiplexed data of the fourth embodiment differs from that used in the second embodiment in that the multiplexed data comprises two types of object data, first object data and second object data.

In the figure, reference numerals 501 to 504 designate packets constituting multiplexed data, and numerals 501 and 504 designate packets of first object data, numeral 503 designates a packet of second object data, and numeral 502 designates a packet containing object control data (hereinafter referred to as command packet). As shown in FIG. 3, each packet has a header section and a data section, the header section including time information and other information. As in the second embodiment, the command packet 502 is a deletion command requesting to delete object, and the time information included in the header section 502a indicates a time at which the deletion command should be executed.

Hereinafter a description is given of the operation of the decoding apparatus of the fourth embodiment when the multiplexed data shown in FIG. 5 is input.

The multiplexed data S451 is input to the decoding apparatus according to the fourth embodiment. This multiplexed data S451 is input to the demultiplexing means 401 where first coded object data S452, second coded object data S453, time clock reference information of object data S454, and presentation time information S456 are obtained by demultiplexing the data S451, and output to the decoding buffers 402a and 402b, the time clock generating means 408, and the presenting means 407, respectively. Since the demultiplexing means 401 included in the decoding apparatus of the fourth embodiment has a command extracting capability, it detects the command packet 502 shown in FIG. 5 to obtain a command that requests to delete object and the information included in the header section 502a of the packet 502 that indicates a time when the command should be executed. The demultiplexing means 401 outputs the time at which the deletion command should be executed to the buffer managing means 409 as expiration time information S455.

The decoding process and presentation of object data, and the processing to time information are performed as in the third embodiment. Further, as for the control over the composited data buffer 406, the buffer managing means 409 performs it using the expiration time information S455 in the same manner as in the third embodiment.

As described above, the decoding apparatus performing buffer control according to the fourth embodiment comprises a demultiplexing means 401 having a command extracting capability, and this apparatus receives multiplexed data including a command requesting deletion and the information of a time at which the command should be executed, as an input, and controls storage and holding of composited object data in the composited data buffer 406 by making a comparison between the time information used as a deletion condition that is obtained from the multiplexed data and the time information of the decoding apparatus, as in the case of the third embodiment where the time information obtained from multiplexed data is used as it is, as a deletion condition. Therefore, the reuse of composited object data according to deletion condition is made possible, and the resultant reduction in an amount of coded data can improve effective utilization of storage and transmission media.

In the fourth embodiment, for multiplexed data including first to N-th object data, processing can performed by employing decoding buffer, object decoding means, and composition buffer, each N in number, as in the third embodiment.

Further in the fourth embodiment, multiplexed data including a command multiplexed with coded object data and others is input and later demultiplexed to be used. However, the command transmitted apart from the time clock reference information and coded object data may be used.

Although in the fourth embodiment the buffer managing means performs control over holding the object data within the composited data buffer, this control can be applied to the decoding buffers, the operating buffers for decoding, and the composition buffers. The control over the decoding buffers as in the first embodiment can reduce storage of the storage media consumed for holding, and the control over the operating buffers for decoding, the composition buffers, or the composited data buffer can improve processing efficiency for data reuse.

In addition, each buffer can be controlled without overflow in the buffer if the control is performed according to the priorities predetermined for each object.

Embodiment 5

In a buffer controlling method according to a fifth embodiment of the present invention, judgement is made using a condition with respect to an event that corresponds to user's operation in response to a presented result, as a deletion condition allowing to delete the data stored in a buffer.

Figure 6:
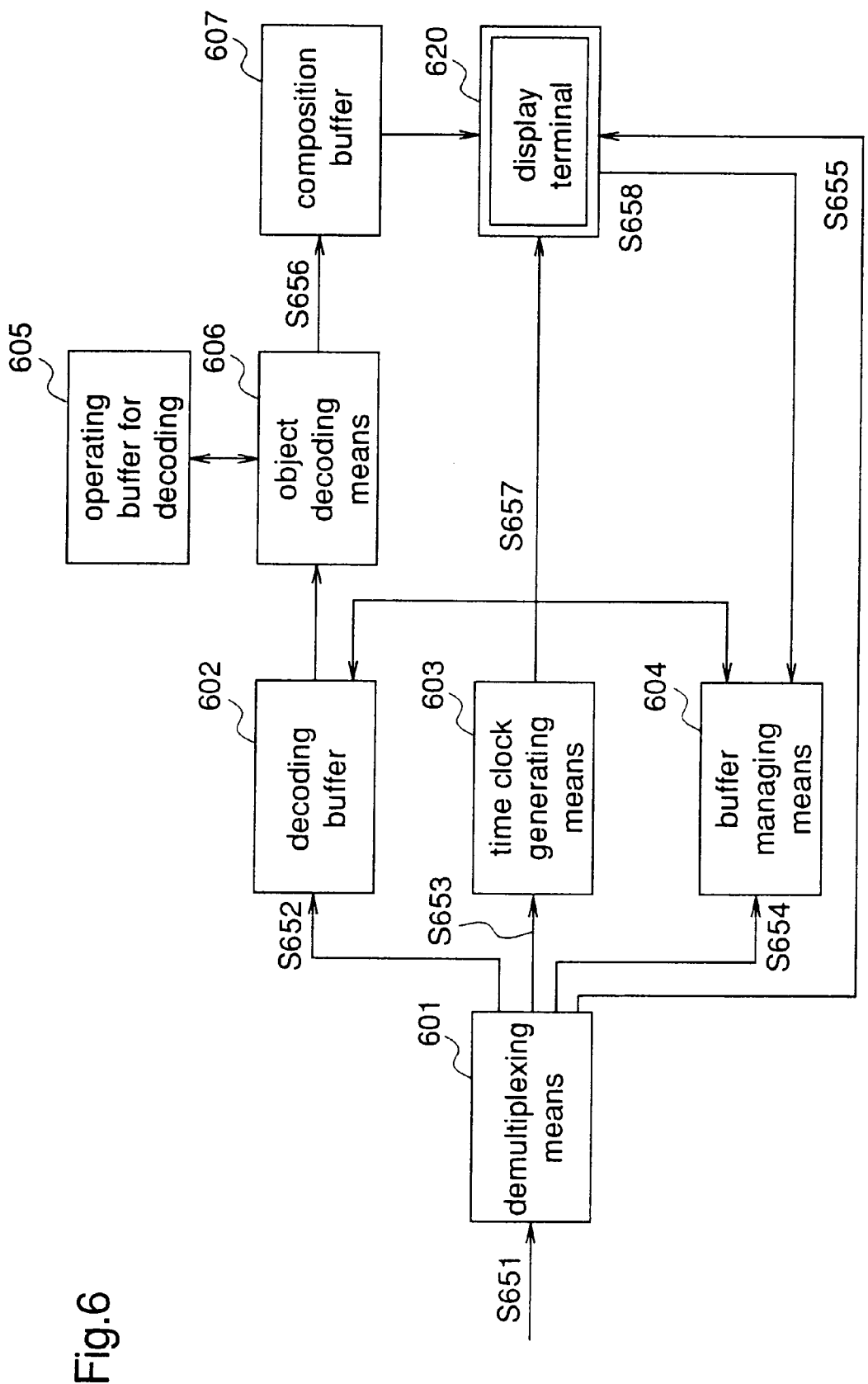
FIG. 6 is a diagram illustrating the construction of a decoding apparatus performing buffer control according to a fifth embodiment of the present invention.
Figure 7:
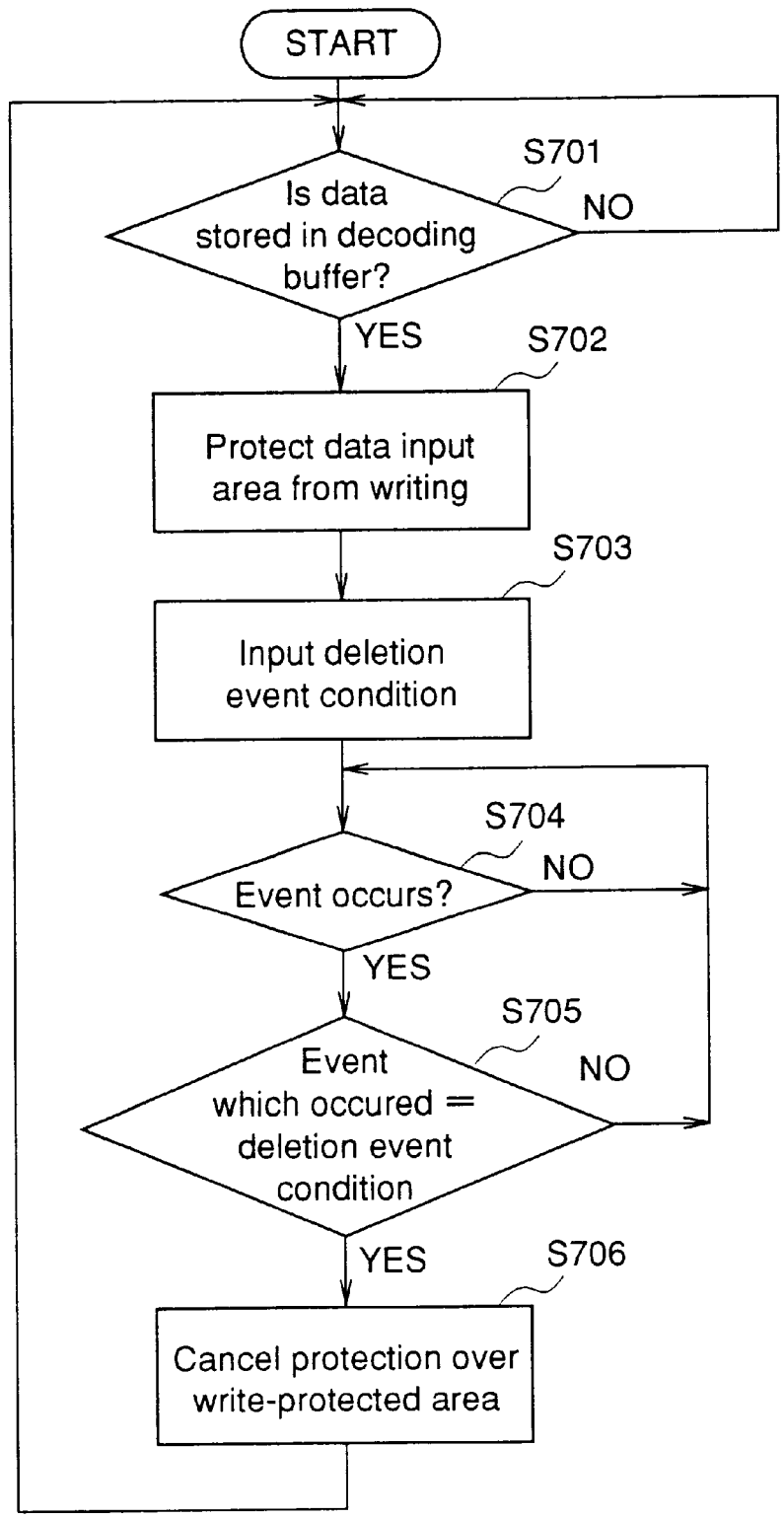
FIG. 7 is a flowchart illustrating the process steps of a buffer control performed by a buffer managing means in the fifth embodiment.
Figure 8:
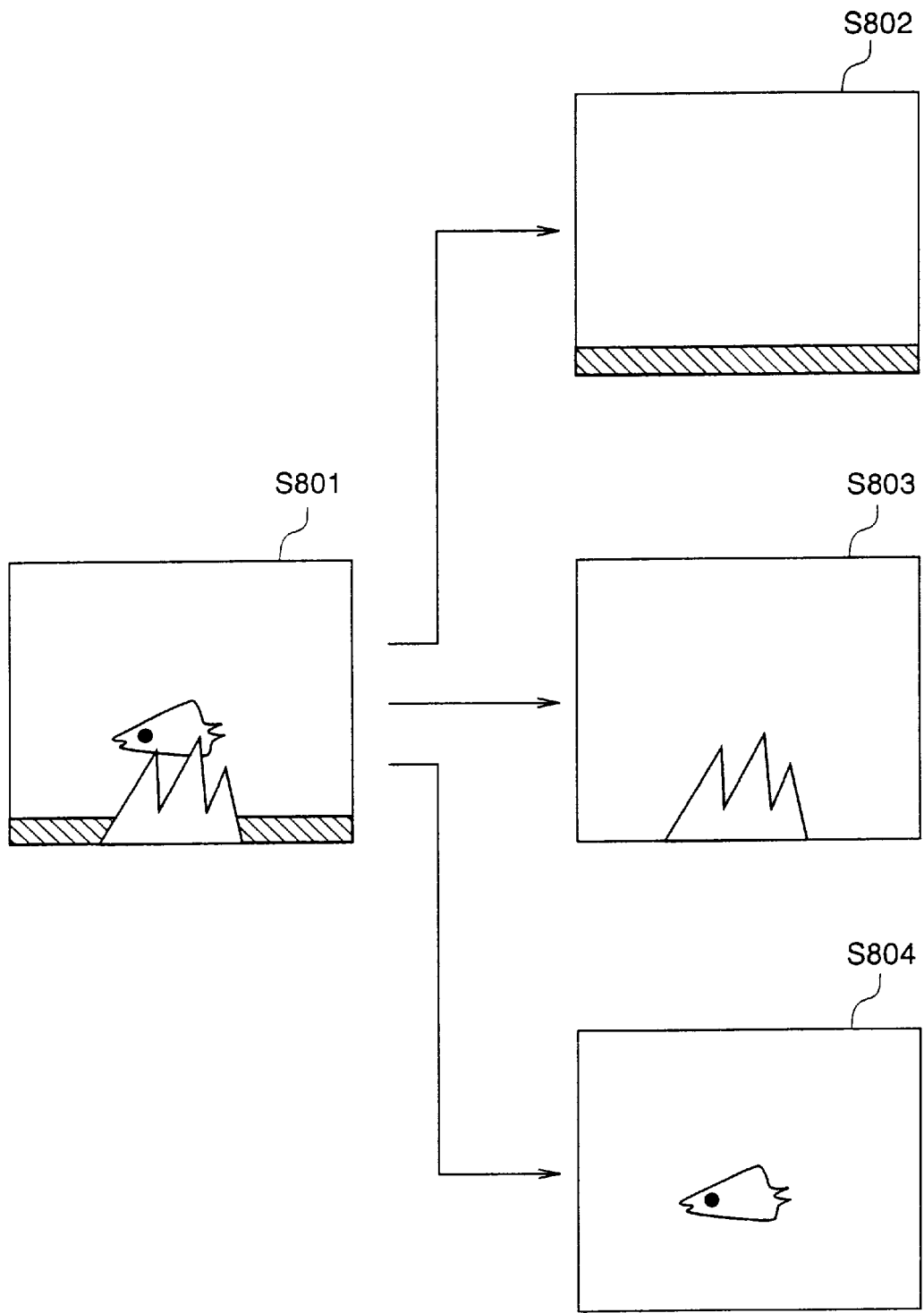
FIG. 8 is a diagram for explaining object data processing.
Figure 9:
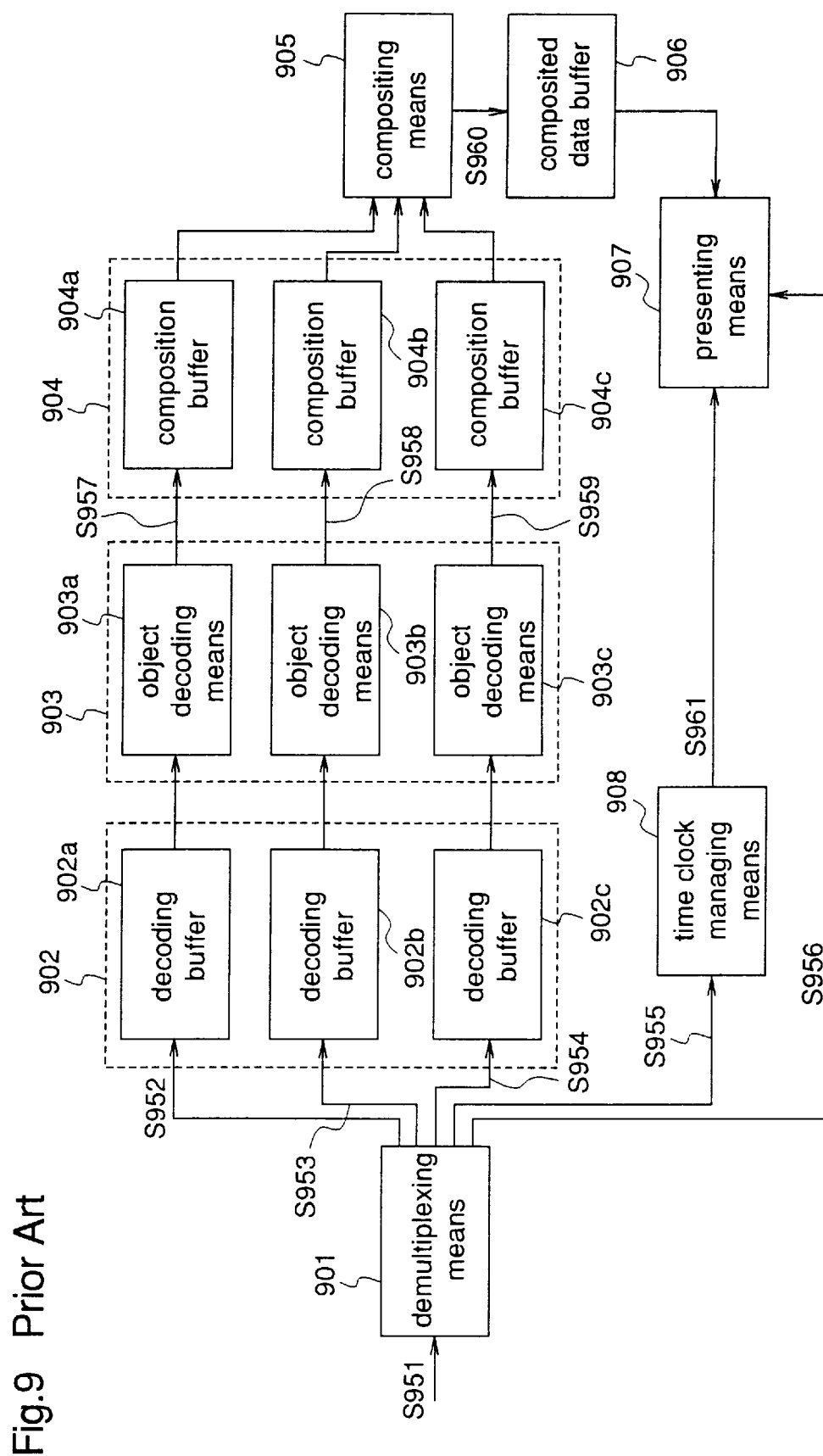
FIG. 9 is a block diagram illustrating the construction of a prior art decoding apparatus for processing multiplexed data.
Figure 10:
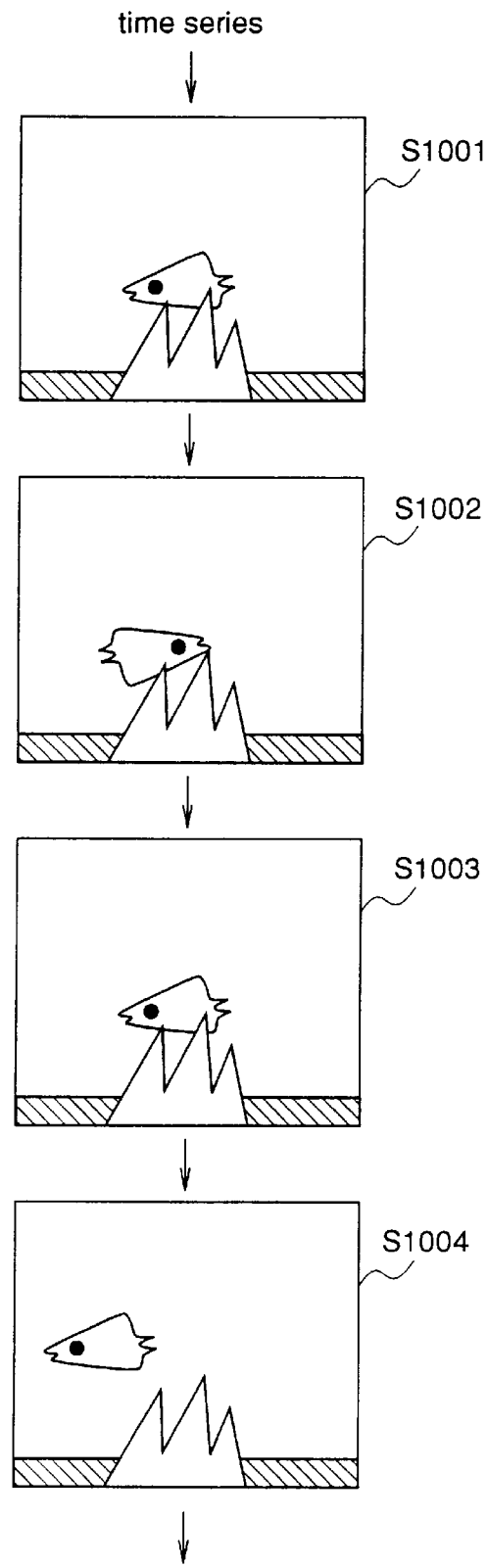
FIG. 10 is a diagram for explaining a possibility of reusing object data in decoding apparatus.

FIG. 6 is a block diagram illustrating the construction of a decoding apparatus according to the fifth embodiment of the present invention, and FIG. 7 is a flowchart showing the process steps of a buffer control according to the fifth embodiment. The decoding apparatus of the fifth embodiment comprises: a demultiplexing means 601, a decoding buffer 602, a time clock generating means 603, a buffer managing means 604, an operating buffer for decoding 605, an object decoding means 606, a composition buffer 607, and a display terminal 620.

The display terminal 620 is implemented by a personal computer comprising a display, A CPU, a mouse, and a keyboard, for example, and accepts an operation from a user in response to a presented result which is a device output of the decoding apparatus. The display terminal 620 causes events to occur corresponding to the operation from user in a method which will be described, and outputs the information indicating the generated events as event information. The buffer managing means 604 controls storage and holding of data in the decoding buffer 602 by using a deletion condition and a condition for judgement in the first embodiment, but differs from the case of the first embodiment in that deletion event condition is used as a deletion condition, and the event information output from the display terminal 620 is used as a condition for judgement.

The demultiplexing means 601 receives multiplexed data as an input and demultiplexes the data to generate coded object data, time clock reference information, and presentation time information of object data, like the demultiplexing means 101 of the first embodiment, but differs from that of the first embodiment in that deletion event information is generated in place of expiration time information. The decoding buffer 602, the time clock generating means 603, the operating buffer for decoding 605, the object decoding means 606, and the composition buffer 607 are identical to the respective components 102, 103, 105, 106, and 107 of the first embodiment.

Hereinafter a description is given of the operation for multiplexed data processing by the decoding apparatus of the fifth embodiment which is thus constructed with reference to FIGS. 6 and 7.

First of all, multiplexed data S651 as a processing object is input to the decoding apparatus of the fifth embodiment. The multiplexed data S651 comprises deletion event information that is deletion condition information of coded object data, in addition to the coded object data, time clock reference information, and presentation time information that are multiplexed together as in the case of the device output of the decoding apparatus of the first embodiment. As in the first embodiment, a deletion condition of an object indicates a condition which reduces or removes a possibility of reusing the object, and when this condition is met, the decoding apparatus of the fifth embodiment stops holding object data in buffer.

As described above, the display terminal 620 of the fifth embodiment has functions of accepting operation from user in response to the presented result and causing events to occur corresponding to the operations. Events occur corresponding to the operations from user at display terminal by means of a mouse or a keyboard; For example, an event can be occurred by moving a pointer over the object data displayed on a display using a mouse and pressing the mouse switch. In the decoding apparatus of the fifth embodiment, a possibility of reusing a specific object is determined by a specific event occurred by the display terminal 620, and deletion event information indicating the occurrence of a specific event is used as a deletion condition.

In the decoding apparatus of the fifth embodiment, the multiplexed data S651 is input to the demultiplexing means 601 which demultiplexes this data S651 to generate coded object data S652, time clock reference information S653, deletion event information of object data S654, and display time information of object data S655. Then, the demultiplexing means 601 outputs the coded object data S652 to the decoding buffer 602, the time clock reference information S653 to the time clock generating means 603, the deletion event information S654 to the buffer managing means 604, and the presentation time information S655 to the display terminal 620. The decoding butter 602 holds the input coded object data S652 under the control by the buffer managing means 604.

The object decoding means 606 fetches the coded object data S652 from the decoding buffer 602 and performs decoding processing using the operating buffer for decoding 605 to generate decoded object data S656. As in the fist embodiment, the object decoding means 606, for example, copies the coded object data S652 held in the decoding buffer 602 to the operating buffer for decoding 605 to perform decoding processing to the data held in the operating buffer for decoding 605. The object decoding means 606 outputs the resultant decoded object data S656 to the composition buffer 607 which holds the decoded object data until the display terminal 620 fetches it.

On the other hand, the time clock generating means 603 generates time clock information S657 based on the time clock reference information S653, and outputs the same to the display terminal 620. The display terminal 620 compares the input time clock information S657 with the presentation time information S655. When it is judged that the time clock information S657 conforms to the presentation time information S655, the display terminal fetches the decoded object data S656 and displays the same. Furthermore, in the fifth embodiment, user can perform inputting in response to the presented result at the display terminal 620, and when the inputting is performed, a specific event corresponding to the inputting occurs as described above. At the occurrence of the event, the display terminal 620 generates event information S658 indicating an event which occurred and outputs it to the buffer managing means 604.

As for the operating buffer for decoding 605 and the composition buffer 607, holding of data is not considered, as in the decoding apparatus of the first embodiment.

The buffer managing means 604 controls storage and holding of data in the decoding buffer 602 according to the process steps shown in the flowchart of FIG. 7. Step 701 is identical to Step 201 of the first embodiment, and a loop is repeated until Step 702 is performed following the judgement in Step 701 that the storage is performed.

When Step 702 is performed, the buffer managing means 604 performs control such that an area of the decoding buffer 602 where coded object data S652 is stored is protected from writing. Thus, the coded object data S652 is held in the decoding buffer 602 without being deleted or overwritten.

In Step 703, the buffer managing means 604 fetches the deletion event information S654 and sets it as a deletion condition. Then, in Step 704, the buffer managing means 604 checks whether the event information S658 is output from the display terminal 620, thereby judging whether event has occurred or not. The judgement is made repeatedly in Step 704 until the occurrence of the event, and when it is judged that an event has occurred, Step 705 follows this step.

In the subsequent Step 105, the buffer managing means 604 treats event information S658 input from the display terminal 620 as a condition for judgement and compares it with deletion event information S654 as a deletion condition. When the event information S658 does not conform to the deletion event information S654, Step 704 is performed again, and the judgement is made repeatedly until the next occurrence of the event.

When it is judged that the event information S658 output from the display terminal 620 conforms to the deletion event information S654 after repeated execution of a loop of Steps 704 and 705, Step 706 is performed.

In Step 706, the buffer managing means 604 cancels the write protection over the area of the decoding buffer 602 which has been designated as a write-protected area in Step 701. Consequently, the coded object data held due to the designation of write protection in Step 701 can be deleted by overwriting other data.

In the decoding apparatus of the fifth embodiment, coded object data is held in the decoding buffer 602 until an event indicated by deletion event information occurs at the display terminal 620. Therefore, reuse of coded object data within the decoding buffer 602 is made possible by setting such that the object decoding means 606, when "repetition" is instructed, fetches the coded object data held in the decoding butter 602 to perform the decoding processing again. In the fifth embodiment, the use of event information enables to give commands such as "repetition" corresponding to user's operation.

As described above, the decoding apparatus performing buffer control according to the fifth embodiment comprises a buffer managing means 604, and this apparatus receives multiplexed data including the information indicating deletion condition as an input and controls storage and holding of coded object data within the decoding buffer 602, corresponding to the operation from user by comparing the information indicating a deletion condition which is demultiplexed from the mulitplexed data with the event information indicating an event occurring in the decoding apparatus. Therefore, reuse of coded object data according to a deletion condition is made possible, and the resultant reduction in an amount of coded data can realize effective utilization of storage and transmission media.

According to the fifth embodiment, the decoding apparatus of the first embodiment comprising a display terminal is employed and event information is used as a condition for judgement. However, this control may be performed by using the decoding apparatus of the third embodiment further comprising a display terminal in which the buffer managing means receives a deletion event condition and event information as input, and the same effects can be obtained.

Although in the fifth embodiment multiplexed data including deletion event information multiplexed with coded object data and others is input and later demultiplexed to be used, the deletion event information transmitted apart from coded object data and time clock reference information may be used.

Although in the fifth embodiment the buffer managing means performs control over holding of the object data within the decoding buffer, this control may be applied to the operating buffer for decoding and the composition buffer. The control of the decoding buffer can reduce storage of the storage media consumed for holding as in the first embodiment, and the control of the operation buffer for decoding and the composition buffer can improve processing efficiency for data reuse.

Furthermore, each buffer may be controlled without causing overflow in the buffer by performing control according to the priorities predetermined for each object.

As for the buffer control methods defined in the first to fifth embodiments, a decoding apparatus performing buffer controls of the respective embodiments is implemented by recording a decoding program for performing a decoding processing that includes the buffer controls defined in the respective embodiments, into a program storage medium such as floppy disk or CD-ROM, and executing this decoding program in a computer system and the like.

What is claimed is:

1. A buffer control method for controlling a buffer used for decoding processing when coded digital data is input, said method comprising:

an input step where the input digital data is stored in a decoding buffer;

a decoding step where decoding processing is performed to the digital data stored in the decoding buffer using an operating buffer for decoding to generate decoded digital data, and the decoded digital data is stored in a composition buffer;

a time clock generating step where time clock reference information used for obtaining a time clock for decoding processing is input, and time clock information indicating the time clock is generated based on the time clock reference information;

a presentation step where presentation time specifying information that specifies a time at which specific digital data should be presented is input, and the specific digital data is presented using the time clock information and the presentation time specifying information; and a buffer managing step where a previously set deletion condition that determines deletion of specific digital data is input, and control is performed such that the specific digital data shall not be held in the buffer when the deletion condition is satisfied.

2. The buffer control method defined in claim 1 wherein, in the presentation step, the decoded digital data stored in the composition buffer is presented.

3. The buffer control method defined in claim 1 wherein the input coded digital data comprises first to N-th digital data, said method comprising the steps of:

the input step where the first to N-th input digital data input are stored in first to N-th decoding buffers, respectively;

the decoding step where decoding processing is performed to the first to N-th digital data stored in the first to N-th decoding buffers, using first to N-th operating buffers for decoding, to generate first to N-th decoded digital data and storing the respective data into first to N-th composition buffers;

a composition step of compositing the first to N-th decoded digital data stored in the first to N-th composition buffers to generate composited digital data and storing the composited data in a composited data buffer; and the presentation step where the composited digital data stored in the composited data buffer is presented.

4. The buffer control method defined in claim 1 wherein, in the buffer managing step, holding of digital data in the decoding buffer is controlled based on the deletion condition.

5. The buffer control method defined in claim 1 wherein, in the buffer managing step, holding of digital data in the operating buffer for decoding is controlled based on the deletion condition.

6. The buffer control method defined in claim 1 wherein, in the buffer managing step, holding of decoded digital data in the composition buffer is controlled based on the deletion condition.

7. The buffer control method defined in claim 3 wherein, in the buffer managing step, holding of composited digital data in the composited data buffer is controlled based on the deletion condition.

8. The buffer control method defined in claim 1 wherein, in the buffer managing step, expiration time information indicating a specific time is used as the deletion condition.

9. The buffer control method defined in claim 8 wherein, in the buffer managing step, the expiration time information is obtained based on a deletion command that requests to delete digital data and time information regarding the deletion command.

10. The buffer control method defined in claim 1 wherein, in the buffer managing step, presentation time specifying information that specifies a time at which specific digital data should be presented is used as the deletion condition.

11. The buffer control method defined in claim 10 wherein, in the buffer managing step, among plural pieces of presentation time specifying information for the specific digital data, the information whose value is maximum is used as the deletion condition.

12. The buffer control method defined in claim 1 wherein, in the buffer managing step, a deletion event condition that is the information that specifies one of events occurring in the decoding apparatus, is used as the deletion condition, and the control is performed based on the deletion event condition and event information indicating an event occurring in the decoding apparatus.

13. A decoding apparatus receiving coded digital data as an input and performing decoding processing while controlling a buffer used for data processing, comprising:

a decoding buffer for storing the input digital data;

an object decoding means for performing decoding processing to the digital data stored in the decoding buffer to generate decoded digital data;

an operating buffer for decoding used for the operation for the decoding processing in the object decoding means;

a composition buffer for storing the decoded digital data generated by the object decoding means;

a time clock generating means for receiving time clock reference information used for obtaining a time clock for decoding processing, as an input, and generating time clock information indicating the time clock based on the time clock reference information;

a presenting means for receiving presentation time specifying information that indicates a time at which specific digital data should be presented, as an input, and presenting the specific digital data based on the time clock information and the presentation time specifying information; and a buffer managing means for receiving a previously set deletion condition that determines deletion of specific digital data, as an input, and controlling such that the specific digital data shall not be held in a buffer when the deletion condition is satisfied.

14. The decoding apparatus defined in claim 13 wherein the presenting means presents the decoded digital data stored in the composition buffer.

15. The decoding apparatus defined in claim 13 wherein the input coded digital data comprises first to N-th digital data, said decoding apparatus comprising:

the decoding buffer comprising first to N-th decoding buffers for storing the first to N-th digital data;

the object decoding means comprising first to N-th object decoding means for performing decoding processing to the first to N-th digital data stored in the first to N-th decoding buffers to generate first to N-th decoded digital data;

the operating buffer for decoding comprising first to N-th operating buffers for decoding which are used by the first to N-th object decoding means, respectively;

the composition buffer comprising first to N-th composition buffers for storing the first to N-th decoded digital data;

a compositing means for compositing the first to N-th decoded digital data stored in the first to N-th composition buffers; and a composited data buffer for storing the composited digital data; and the presenting means presenting the composited digital data stored in the composited data buffer.

16. A decoding program recording medium for recording a decoding program which performs decoding processing while controlling a buffer used for data processing, said decoding program comprising:

an input step where input digital data is stored in a decoding buffer;

a decoding step where decoding processing is performed to the digital data stored in the decoding buffer to generate decoded digital data, and the decoded data is stored in a composition buffer;

a time clock generating step where time clock reference information used for obtaining a time clock for decoding processing is input, and time clock information that indicates the time clock is generated based on the time clock reference information;

a presentation step where presentation time specifying information that indicates a time at which specific digital data should be presented is input, and the specific digital data is presented using the time clock information and the presentation time specifying information; and a buffer managing step where a previously set deletion condition that determines deletion of specific digital data is input, and control is performed such that the specific digital data shall not be held when the deletion condition is satisfied.

17. The decoding program recording medium defined in claim 16 for recording the decoding program including the presentation step where the decoded digital data stored in the composition buffer is presented.

18. The decoding program recording medium defined in claim 16 for recording the decoding program in which the input coded digital data comprises first to N-th digital data, said decoding program including:

the input step where the first to N-th input digital data are stored in first to N-th decoding buffers, respectively;

the decoding step where decoding processing is performed to the first to N-th digital data stored in the first to N-th decoding buffers, using first to N-th operating buffers for decoding, to generate first to N-th decoded digital data and storing the decoded digital data in first to N-th composition buffers;

a compositing step where the first to N-th decoded digital data stored in the first to N-th composition buffers are composited to generate composited digital data and the composited digital data is stored in a composited data buffer; and the presentation step where the composited digital data stored in the composited data buffer is presented.

* * * * *